United States Patent
Miyaguchi

(10) Patent No.: US 12,265,592 B2
(45) Date of Patent: Apr. 1, 2025

(54) MODEL AGGREGATION FOR FITTED Q-EVALUATION

(71) Applicant: INTERNATIONAL BUSINESS MACHINES CORPORATION, Armonk, NY (US)

(72) Inventor: Kohei Miyaguchi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 783 days.

(21) Appl. No.: 17/546,629

(22) Filed: Dec. 9, 2021

(65) Prior Publication Data

US 2023/0185877 A1 Jun. 15, 2023

(51) Int. Cl.
| G06F 17/17 | (2006.01) |
| G06Q 10/0639 | (2023.01) |
| G06Q 30/0601 | (2023.01) |
| G06Q 50/04 | (2012.01) |

(52) U.S. Cl.
CPC ....... *G06F 17/17* (2013.01); *G06Q 10/06393* (2013.01); *G06Q 30/0631* (2013.01); *G06Q 50/04* (2013.01)

(58) Field of Classification Search
None
See application file for complete search history.

(56) References Cited

U.S. PATENT DOCUMENTS

| 7,047,224 | B1 * | 5/2006 | Neuneier | G06Q 10/00 706/12 |
| 12,050,438 | B1 * | 7/2024 | Ebrahimi Afrouzi | G05B 13/0205 |
| 12,128,897 | B2 * | 10/2024 | Yan | B60W 30/16 |
| 2016/0105351 | A1 * | 4/2016 | Slivkins | H04L 67/535 709/224 |
| 2019/0073363 | A1 * | 3/2019 | Perez | G06F 16/335 |
| 2020/0164746 | A1 * | 5/2020 | Rekapalli | B60K 35/80 |
| 2020/0394473 | A1 | 12/2020 | Dudik et al. | |
| 2022/0284306 | A1 * | 9/2022 | Osogami | G06N 7/01 |

OTHER PUBLICATIONS

Mell et al., "The NIST Definition of Cloud Computing", National Institute of Standards and Technology, Special Publication 800-145. Sep. 2011, pp. 1-7.
Le, Hoang M., et al. "Batch Policy Learning under Constraints", arXiv:1903.08738v1 [cs.LG]. Mar. 20, 2019, pp. 1-30.

(Continued)

*Primary Examiner* — Maikhanh Nguyen
(74) *Attorney, Agent, or Firm* — Tutunjian & Bitetto, P.C.; Robert Richard Aragona

(57) ABSTRACT

A computer-implemented method is provided for policy evaluation. In the method, the utility of the given decision-making policy is estimated based on a dataset of state-action-reward-state tuples, a set of candidate bootstrapping estimators of the fitted Q-evaluation (FQE) algorithm, and a criterion function. The method automatically selects the best bootstrapping estimator from the candidates based on the criterion function and, when the criterion function is appropriately designed, it produces a good policy-value estimate such that the estimation error is small (below a threshold).

25 Claims, 7 Drawing Sheets

(56) References Cited

OTHER PUBLICATIONS

Chen, Yutian, et al. "On Instrumental Variable Regression for Deep Offline Policy Evaluation", arXiv:2105.10148v1 [cs.LG]. May 21, 2021, pp. 1-41.

Hao, Botao, et al. "Bootstrapping Fitted Q-Evaluation for Off-Policy Inference", InInternational Conference on Machine Learning. Jul. 1, 2021, pp. 4074-4084.

Tang, Shengpu, et al. "Model Selection for Oine Reinforcement Learning: Practical Considerations for Healthcare Settings", Proceedings of Machine Learning Research, arXiv:2107.11003v1 [cs.LG]. Jul. 23, 2021, pp. 1-34.

\* cited by examiner

MODEL AGGREGATION FOR FITTED Q-EVALUATION

BACKGROUND

The present invention generally relates to data models, and more particularly to model aggregation for fitted Q-evaluation.

Offline policy evaluation (OPE) is a component of automatic decision optimization (AutoDO). It is the problem of assessing the H-step expected utility $H_H(\pi)$ of decision-making policies $\pi$ based on offline data $\mathcal{D}_n$. OPE is an essential building block of automatic decision making as it is necessary for assessing and improving policies in offline settings. For example, it is necessary for evaluating new policies before their deployment, where the policies may represent recommender algorithms in e-commerce services or production schedulers in plants.

Direct Method (DM) is one of major classes of OPE methods, in which $J_H(\pi)$ is estimated based on models $\mathcal{M}$ explicitly or implicitly.

Fitted Q-Evaluation (FQE) is one of the SOTA Direct Methods wherein Q-function $Q_H^\pi(s, a)$ is estimated, where s denotes a state, and a denotes an action. In practice, FQE/DMs are known to be more effective than other OPE classes if $\mathcal{M}$ is 'good'. This implies there are different DM candidates corresponding to different $\mathcal{M}$ and not all of them may be useful.

When the given model set $\{\mathcal{M}_k\}_{k=1}^K$, is believed to include at least one accurate model $\mathcal{M}_{k^*}$, then it desired to estimate the best model. However, there is no known method for selecting FQE models in a data-driven manner.

SUMMARY

According to an aspect of the present invention, a computer-implemented method is provided for value function estimation. The method includes (a) obtaining offline data D and a policy $\pi$, the offline data D including a set of tuples of a state, an action, a reward, and a resulting state. The method further includes (b) setting an initial value of an estimated value function $\hat{Q}_0^\pi$ to zero and an initial value of a time step h to 1. The method also includes (c) computing, for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$, where k denotes the index of the models and K denotes the number of the models. The method additionally includes (d) computing, for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$ based on the offline data D, a policy $\pi$ to evaluate, and the estimated value function $\hat{Q}_{h-1}^\pi$ at time step h−1. The method also includes (e) selecting a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \hat{Q}_{h-1}^\pi)$ among each candidate of the estimated value function $\hat{Q}_{k,h}$. The method additionally includes (f) repeating steps (c) to (f) with incrementing time step h until time step h reaches an end of a time step H. The method further includes (g) outputting an estimated value function $\hat{Q}_H^\pi$ at the time step H.

According to other aspects of the present invention, a computer program product is provided for value function estimation. The computer program product includes a non-transitory computer readable storage medium having program instructions embodied therewith. The program instructions are executable by a computer to cause the computer to perform a method. The method includes (a) obtaining, by a processor device of the computer, offline data D and a policy $\pi$, the offline data D including a set of tuples of a state, an action, a reward, and a resulting state. The method further includes (b) setting, by the processor device, an initial value of an estimated value function $\hat{Q}_0^\pi$ to zero and an initial value of a time step h to 1. The method additionally includes (c) computing, by the processor device for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$, where k denotes the index of the models and K denotes the number of models. The method further includes (d) computing, by the processor device for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$ based on the offline data D, a policy $\pi$ to evaluate, and the estimated value function $\hat{Q}_{h-1}^\pi$ at time step h−1. The method also includes (e) selecting, by the processor device, a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \pi, \hat{Q}_{h-1}^\pi)$ among each candidate of the estimated value function $\hat{Q}_{k,h}$. The method additionally includes (f) repeating, by the processor device, steps (c) to (f) with incrementing time step h until time step h reaches an end of a time step H. The method further includes (g) outputting, by the processor device, an estimated value function $\hat{Q}_H^\pi$ at the time step H.

According to yet other aspects of the present invention, a computer processing system is provided for value function estimation. The computer processing system includes a memory device for storing program code. The computer processing system further includes a processor device operatively coupled to the memory device for running the program code to (a) obtain offline data D and a policy $\pi$, the offline data D including a set of tuples of a state, an action, a reward, and a resulting state. The processor device further runs the program code to (b) set an initial value of an estimated value function $\hat{Q}_0^\pi$ to zero and an initial value of a time step h to 1. The processor device also runs the program code to (c) compute, for each of candidate models $\{M_k\}_{k=1}^K$ of an environment, a bootstrapping estimator $\delta_k$ that estimates a value function $Q_h^\pi$ at time step h based on the offline data D and an estimated value function $\delta_k$ at time step h−1 to obtain a candidate of an estimated value function $\hat{Q}_{k,h}$ for each of the candidate models $\{M_k\}_{k=1}^K$, where k denotes the index of the models and K denotes the number of the models. The processor device additionally runs the program code to (d) compute, for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$ based on the offline data D, a policy $\pi$ to evaluate, and the estimated value function $\hat{Q}_{h-1}^\pi$ at time step h−1. The processor device further runs the program code to (e) select a candidate of an estimated value function $\hat{Q}_{k^*,h}$ as an estimated value function $\hat{Q}_h^\pi$ at time step h, where $\hat{Q}_{k*,h}$ has a minimum value of the criterion $C(\hat{Q}_{k*,h}; D, \pi, \hat{Q}_{h-1}^\pi)$ among each candidate of the estimated value function $\hat{Q}_{k,h}$. The processor device also runs the program code to (f) repeat steps (c) to (f) with incrementing time step h until time step h reaches an end of a time step H. The processor device additionally runs the program code to (g) output an estimated value function $\hat{Q}_H^\pi$ at the time step H.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to model aggregation for fitted Q-evaluation.

Embodiments of the present invention can evaluate new policies before their deployment, where the policies may represent, for example, but not limited to, recommender algorithms in e-commerce services or production schedulers in plants or decision algorithms in Advanced Driver Assistance Systems.

Embodiments of the present invention provide a method of offline policy evaluation (OPE), called Generalized FQE (GFQE), that computes an estimated value function $\hat{Q}_H^\pi$ based on multiple candidate models $\{\mathcal{M}_k\}_{k=1}^K$ and a model selection criterion $\mathcal{C}$, wherein $\pi$ denotes a policy for solving an environment, H denotes a time step, k denotes the index of the models, and K denotes the number of the models.

In one or more embodiments of the present invention, each $\mathcal{M}_k$ is represented by $\delta_k$, a (so-called) bootstrapping estimator that estimates a value function $Q_h^\pi$ based on a value function $Q_{h-1}^\pi$ for time horizons h≥1, intended to satisfy $Q_h^\pi \approx \delta_k(\mathcal{D}_n, \pi, Q_{h-1}^\pi)$, where $\mathcal{D}_n$ denotes offline data including a set of tuples of a state, an action, a reward, and a resulting state.

Moreover, in one or more embodiments of the present invention, $\mathcal{C}$ quantifies the negative quality of estimates $\hat{Q}$ generated by the bootstrapping estimators $\delta_k$, intended to satisfy $\mathcal{C}(\hat{Q}; \mathcal{D}_n, \pi, Q_{h-1}^\pi) \leq \mathcal{C}(Q_h^\pi; \mathcal{D}_n, \pi, Q_{h-1}^\pi) \Rightarrow \hat{Q} \approx Q_h^\pi$.

In this way, in accordance with one or more embodiments, a value function can be estimated for use, in turn, to estimate an expected utility of a decision-marking policy as an expected value of the value function based on offline data for offline policy evaluation.

Figure 1:
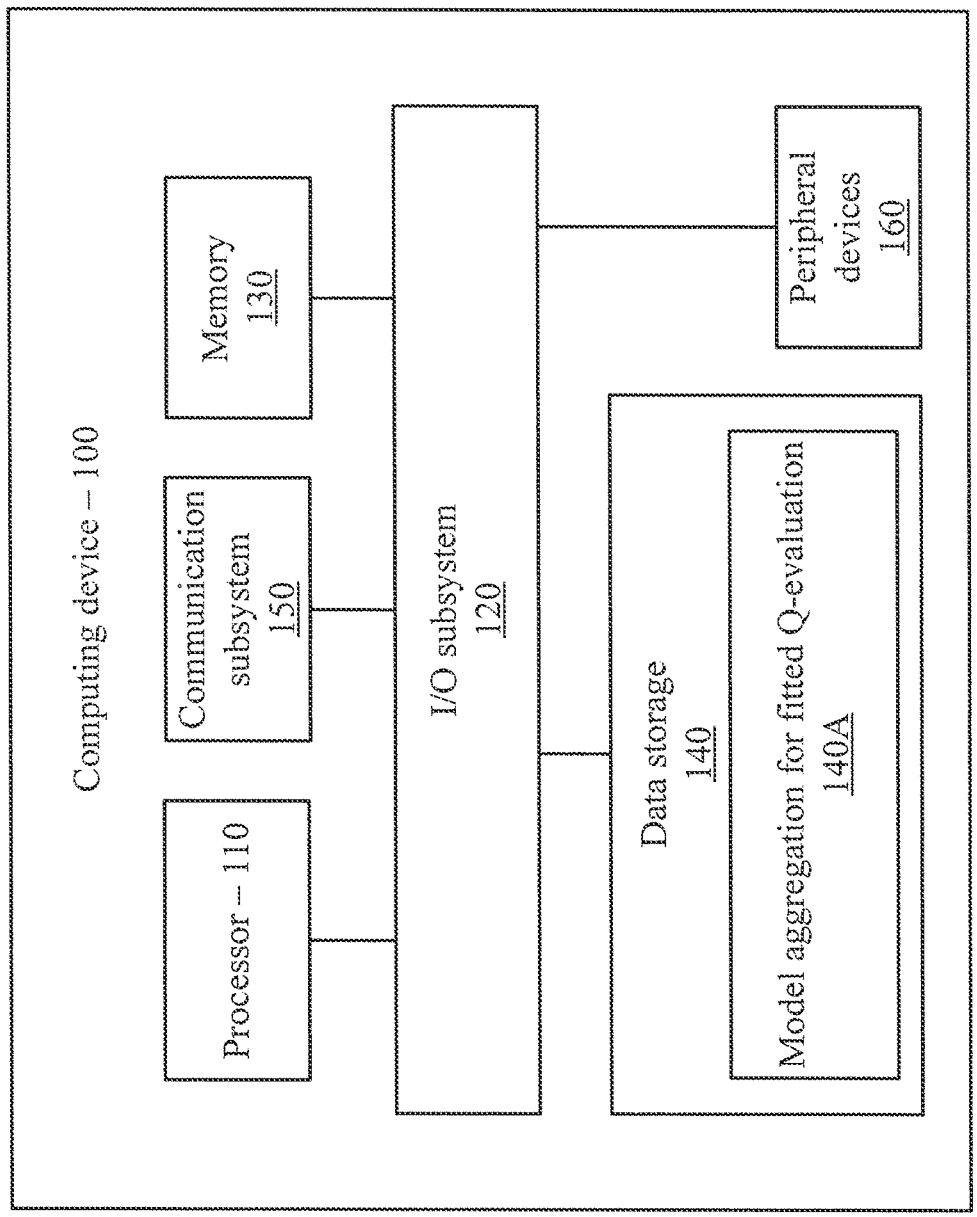
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform model aggregation for fitted Q-evaluation.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for model aggregation for fitted Q-evaluation. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 6-7). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
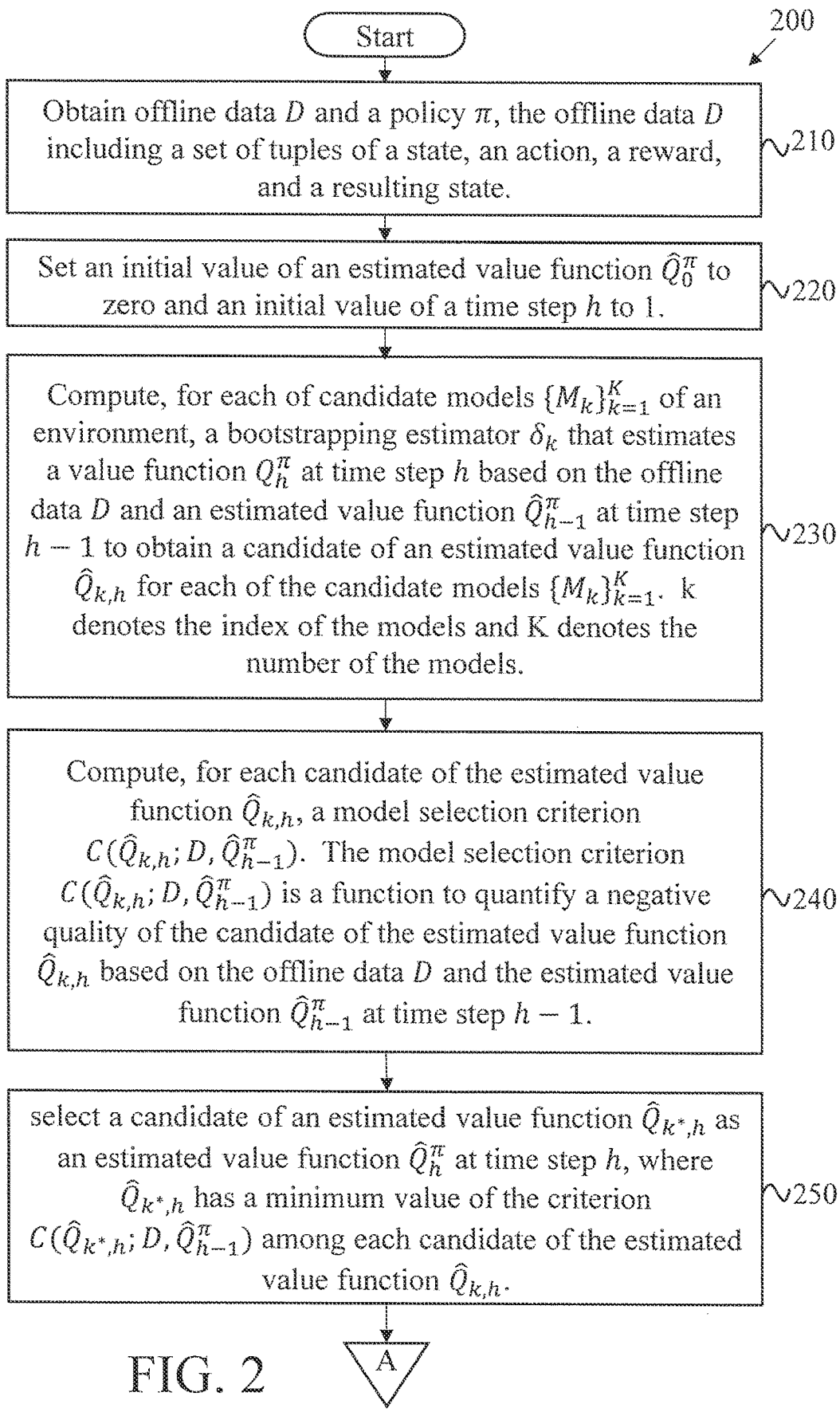
FIGS. 2-3 are flow diagrams showing an exemplary method for value function estimation, in accordance with an embodiment of the present invention.
Figure 3:
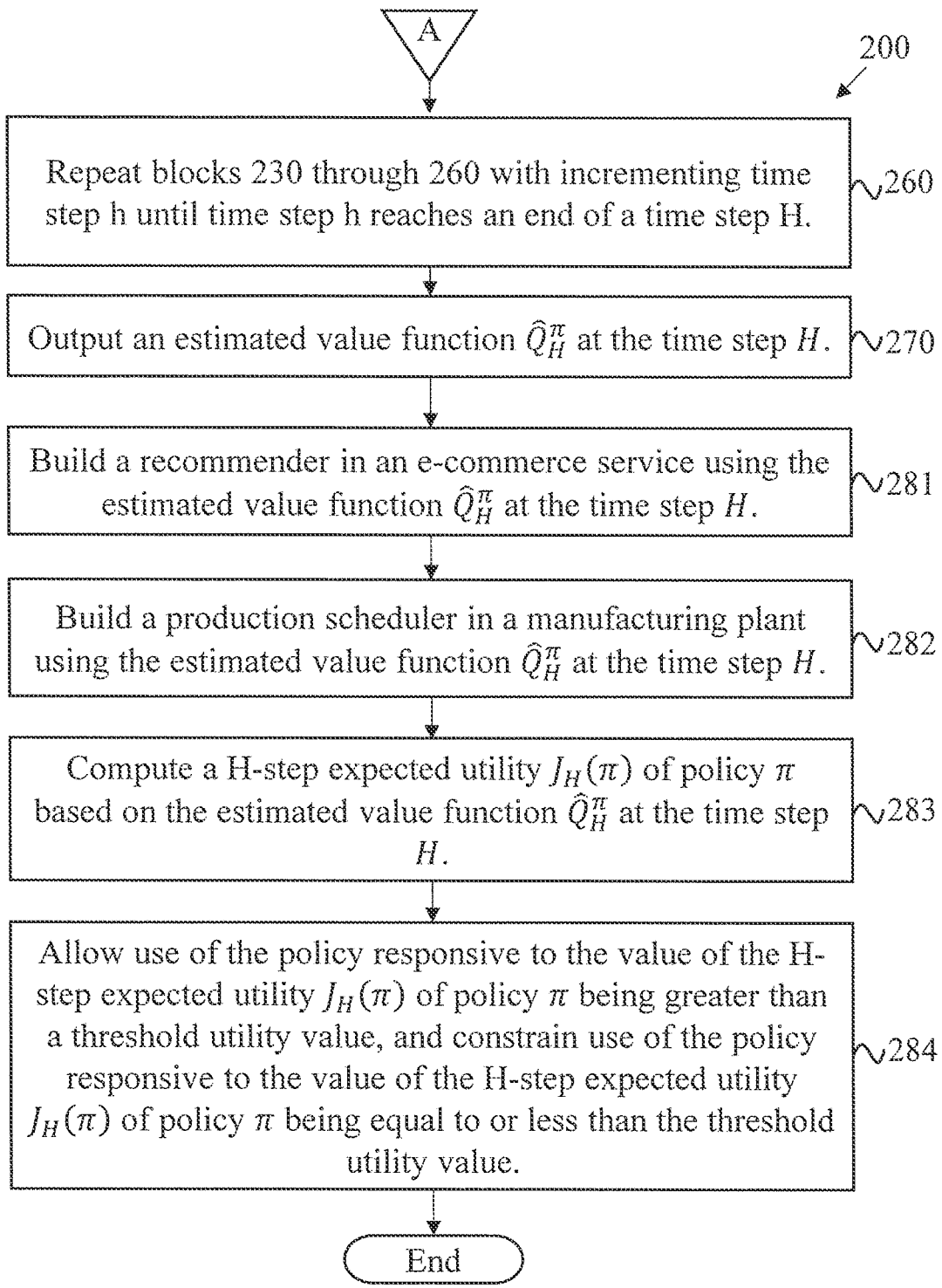

These and other variations of a hardware processor subsystem are also contemplated in accordance with embodiments of the present invention FIGS. 2-3 are flow diagrams showing an exemplary method 200 for value function estimation, in accordance with an embodiment of the present invention.

At block 210, obtain offline data D and a policy π, the offline data D including a set of tuples of a state, an action, a reward, and a resulting state.

At block 220, set an initial value of an estimated value function $\hat{Q}_0^\pi$ to zero and an initial value of a time step h to 1.

At block 230, compute, for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$. k denotes the index of the models and K denotes the number of the models.

At block 240, compute, for each candidate of the estimated value function $\hat{Q}_{k,h}$, a model selection criterion $C(\hat{Q}_{k,h}; D, \hat{Q}_{h-1}^\pi)$. The model selection criterion $C(\hat{Q}_{k,h}; D, \hat{Q}_{h-1}^\pi)$ is a function to quantify a negative quality of the candidate of the estimated value function $\hat{Q}_{k,h}$ based on the offline data D and the estimated value function $\hat{Q}_{h-1}^\pi$ at time step h−1.

At block 250, select a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \hat{Q}_{h-1}^\pi)$ among each candidate of the estimated value function $Q_{k,h}$.

At block 260, repeat blocks 230 through 260 with incrementing time step h until time step h reaches an end of a time step H.

At block 270, output an estimated value function $\hat{Q}_H^\pi$ at the time step H.

At block 281, build a recommender in an e-commerce service using the estimated value function $\hat{Q}_H^\pi$ at the time step H.

At block 282, build a production scheduler in a manufacturing plant using the estimated value function $\hat{Q}_H^\pi$ at the time step H.

At block 283, compute a H-step expected utility $J_H(\pi)$ of policy π based on the estimated value function $\hat{Q}_H^\pi$ at the time step H.

At block 284, allow use of the policy responsive to the value of the H-step expected utility $J_H(\pi)$ of policy π being greater than a threshold utility value, and constrain use of the policy responsive to the value of the H-step expected utility $J_H(\pi)$ of policy π being equal to or less than the threshold utility value.

Figure 4:
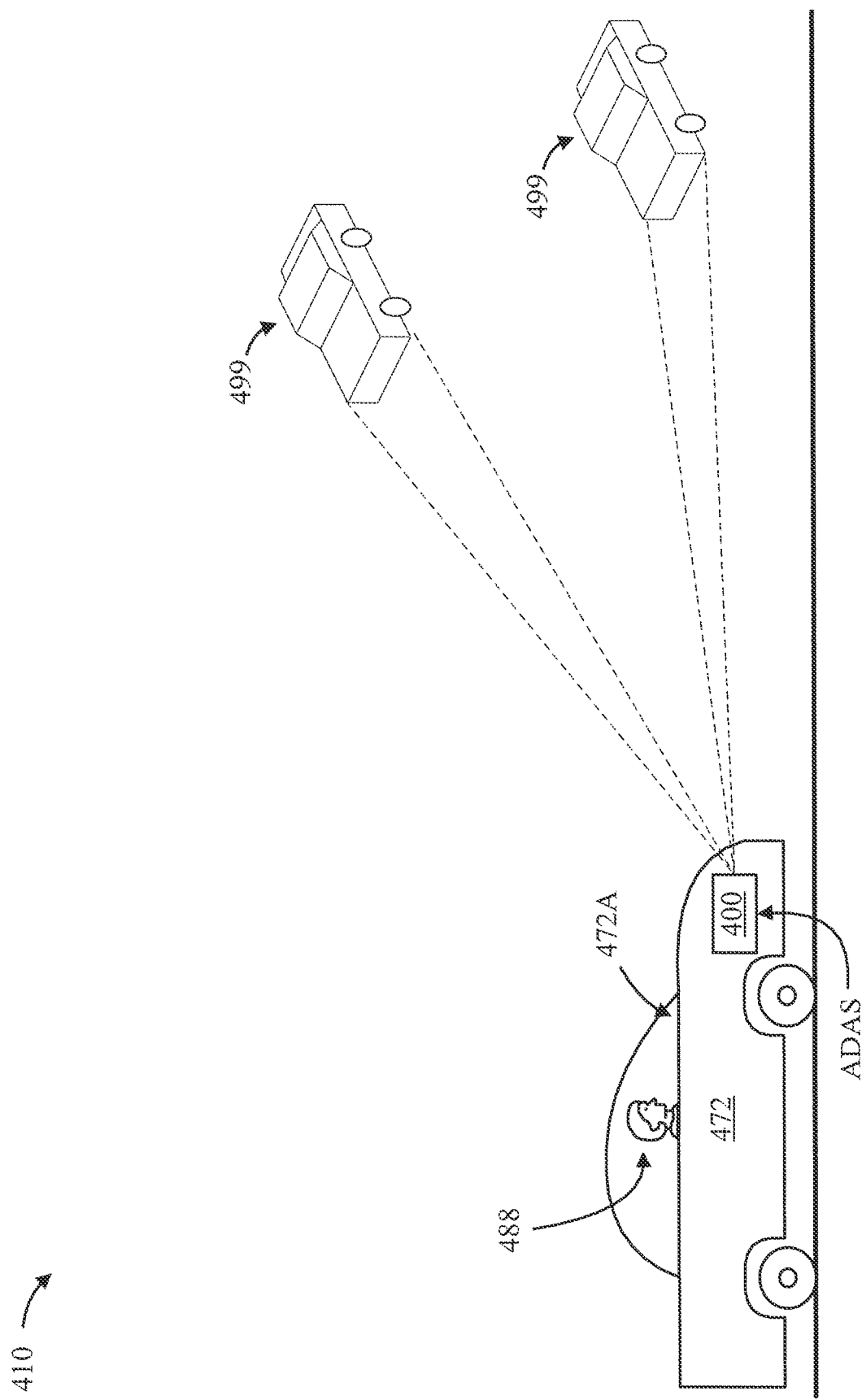
FIG. 4 is a block diagram showing an exemplary environment to which the present invention can be applied, in accordance with an embodiment of the present invention.

FIG. 4 is a block diagram showing an exemplary environment 410 to which the present invention can be applied, in accordance with an embodiment of the present invention.

In the environment 410, a user 488 is located in a scene with multiple objects 499, each having their own locations and trajectories. The user 488 is operating a vehicle 472 (e.g., a car, a truck, a motorcycle, etc.) having an ADAS 477.

The ADAS 477 calculates an H-step expected utility $J_H(\pi)$ of policy π based on the estimated value function $\hat{Q}_H^\pi$ at the time step H. The utility $J_H(\pi)$ of policy π is used to evaluate the quality of the policy π determining what actions to perform responsive to a given situation (upcoming object collision, side swipe collision, pedestrians approaching, etc.).

Responsive to the policy π, a vehicle controlling decision is made. To that end, the ADAS 477 can control, as an action corresponding to a decision, for example, but not limited to, steering, braking, lighting, tire pressure management (TPM), and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 400) may interface with the user through one or more systems of the vehicle 472 that the user is operating. For example, the system of the present invention can provide the user information through a system 472A (e.g., a display system, a speaker system, and/or some other system) of the vehicle 472. Moreover, the system of the present invention (e.g., system 400) may interface with the vehicle 472 itself (e.g., through one or more systems of the vehicle 472 including, but not limited to, a steering system, a braking system, an acceleration system, a steering system, a lighting (turn signals, headlamps) system, etc.) in order to control the vehicle and cause the vehicle 472 to perform one or more actions. In this way, the user or the vehicle 472 itself can navigate around these objects 499 to avoid potential collisions there between. The providing of information and/or the controlling of the vehicle can be considered actions that are determined in accordance with embodiments of the present invention.

Figure 5:
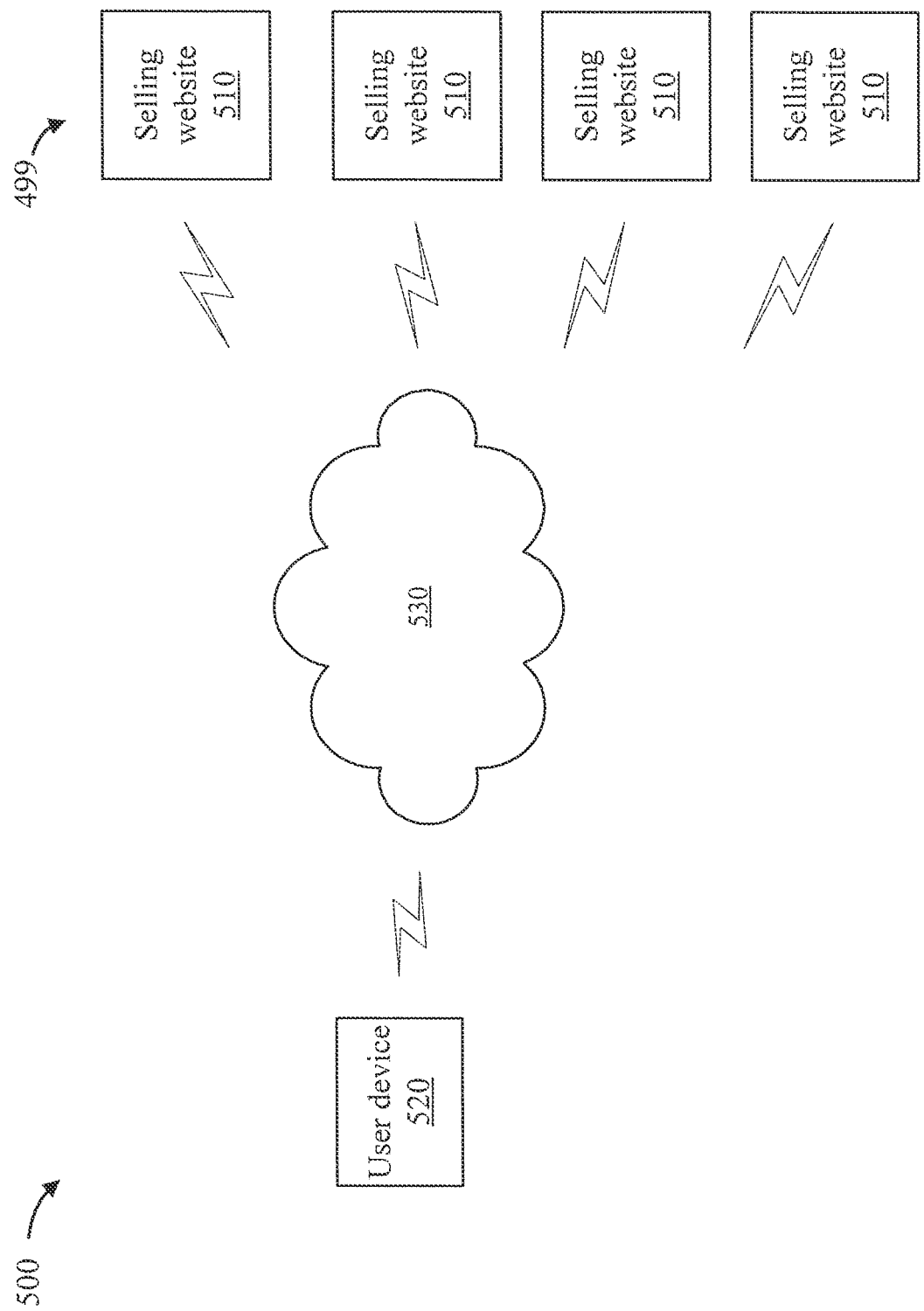
FIG. 5 is a block diagram showing an e-commerce system to which the present invention can be applied, in accordance with an embodiment of the present invention.

FIG. 5 is a block diagram showing an e-commerce system 500 to which the present invention can be applied, in accordance with an embodiment of the present invention.

The e-commerce system 500 includes a plurality of selling websites 510 for interfacing with a user device 520 over one or more networks 530. The user device 520 can be a smartphone, a tablet, a laptop, a desktop computer, a server, a personal digital assistant device, and so forth.

The e-commerce system 500 calculates an H-step expected utility $J_H(\pi)$ of policy π based on the estimated value function $\hat{Q}_H^\pi$ at the time step H. The H-step expected utility $J_H(\pi)$ of policy π is then used to assess which policy is to be used to recommend items to a user. For example, a metric of the assessment of the policy can be to not recommend dangerous or age inappropriate items depending on the age of the user/purchaser. Another metric can be to recommend items of a specific gender or size depending upon characteristics of the user/purchaser.

The result of the assessment is then used to select the best policy from a predefined set of candidate policies. The candidate policies may be rule-based programs manually designed with domain knowledge (such as age restriction, gender-based categories, etc.), those generated by machines (such as the outputs of the reinforcement learning algorithms), and a mixture of those. It is possible to select only the best policy and use it to recommend items to users, or to select multiple policies and then assess them under different metrics such as user feedbacks.

The user device 520 interfaces with the selling web sites 510 in order to receive purchase recommendations based on the selected policy π.

A description will now be given regarding a version of the GFQE algorithm, in accordance with an embodiment of the present invention.

Inputs to the GFQE algorithm include: $\{\delta_k\}_{k=1}^K$; $\mathcal{C}$; data $\mathcal{D}_n$; and policy π.

Outputs to the GFQE algorithm include: $\hat{Q}_H^\pi$ (used to compute $\hat{J}_H(\pi)$).

(1) Initialization: $\hat{Q}_0^\pi := 0$, h:=1.

(2) Run each bootstrapping estimator $\delta_k$ for current time horizon h:

$$\hat{Q}_{k,h} := \delta_k(\mathcal{D}_n, \pi, \hat{Q}_{h-1}^\pi).$$

(3) Select the best estimate according to $\mathcal{C}$:

$$k^* := \arg\min_{1 \leq k \leq K} \mathcal{C}(\hat{Q}_k; \mathcal{D}_n, \pi, \hat{Q}_{h-1}^\pi),$$

$$\hat{Q}_h^\pi := \hat{Q}_{k,h}$$

(4) Increment h and go to (2) until h=H.

A description will now be given regarding a preferred embodiment in accordance with the present invention.

The data is a set of transition tuples $\mathcal{D}_n = \{(s_i, a_i, r_i, s_i')\}_{i=1}^n$, where $s_i$ are preceding states, $a_i$ are actions taken at $s_i$, $r_i$ are the rewards associated with the combinations $(s_i, a_i)$, and $s_i'$ are the subsequent states.

$\delta_k$ is a least-square estimator with the hold-out method such that $$\delta_k(\mathcal{D}_n, \pi, Q) := \arg\min_{\hat{Q} \in \mathcal{F}_k} \sum_{(s_i,a_i,r_i,s_i') \in \mathcal{D}_n^{train}} \sum_{m=1}^M |\hat{Q}(s_i, a_i) - r_i - Q(s_i', a_{i,m}')|^2$$

where $\mathcal{F}_k$ is the space of Q-functions associated with $\mathcal{M}_k$, $\mathcal{D}_n^{train}$ is the training subset of $\mathcal{D}_n$, and $a_{i,m}'$ are the actions drawn from the target policy π(a|s) given s=$s_i'$.

$\mathcal{C}$ is the mean squared error (MSE) with respect to the validation subset $\mathcal{D}_n^{valid} := \mathcal{D}_n \setminus \mathcal{D}_n^{train}$ such that $$\mathcal{C}(\hat{Q}; \mathcal{D}_n, \pi, Q) := \frac{1}{M|\mathcal{D}_n^{valid}|} \Sigma_{(s_i,a_i,r_i,s_i') \in \mathcal{D}_n^{valid}} \Sigma_{m=1}^M |\hat{Q}(s_i, a_i) - r_i - Q(s_i', a_{i,m}')|^2$$

A description will now be given regarding a rationale, in accordance with an embodiment of the present invention.

Take $\mathcal{C}(\hat{Q}; \mathcal{D}_n, \pi, Q_{h-1}^\pi)$ as in the preferred embodiment described above.

Then, GFQE is approximately minimizing the right-hand side of the following inequality, $$\left| \mathbb{E}[\hat{J}_H(\pi)] - J_H(\pi) \right| \leq C' \sum_{1 \leq h \leq H} \sqrt{\mathbb{E}[\mathcal{C}(\hat{Q}_h; \mathcal{D}_n, \pi, \hat{Q}_{h-1})] + U(\hat{Q}_{h-1})}$$

where $C'$ is a constant and U(Q) is an unknown function determined by the environment.

Hence, the error of GFQE's output is bounded to be small.

The key is to fix $\hat{Q}_{h-1}$ in the model selection of $\hat{Q}_h$, which cancels the contribution of $U(\hat{Q}_{h-1})$.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
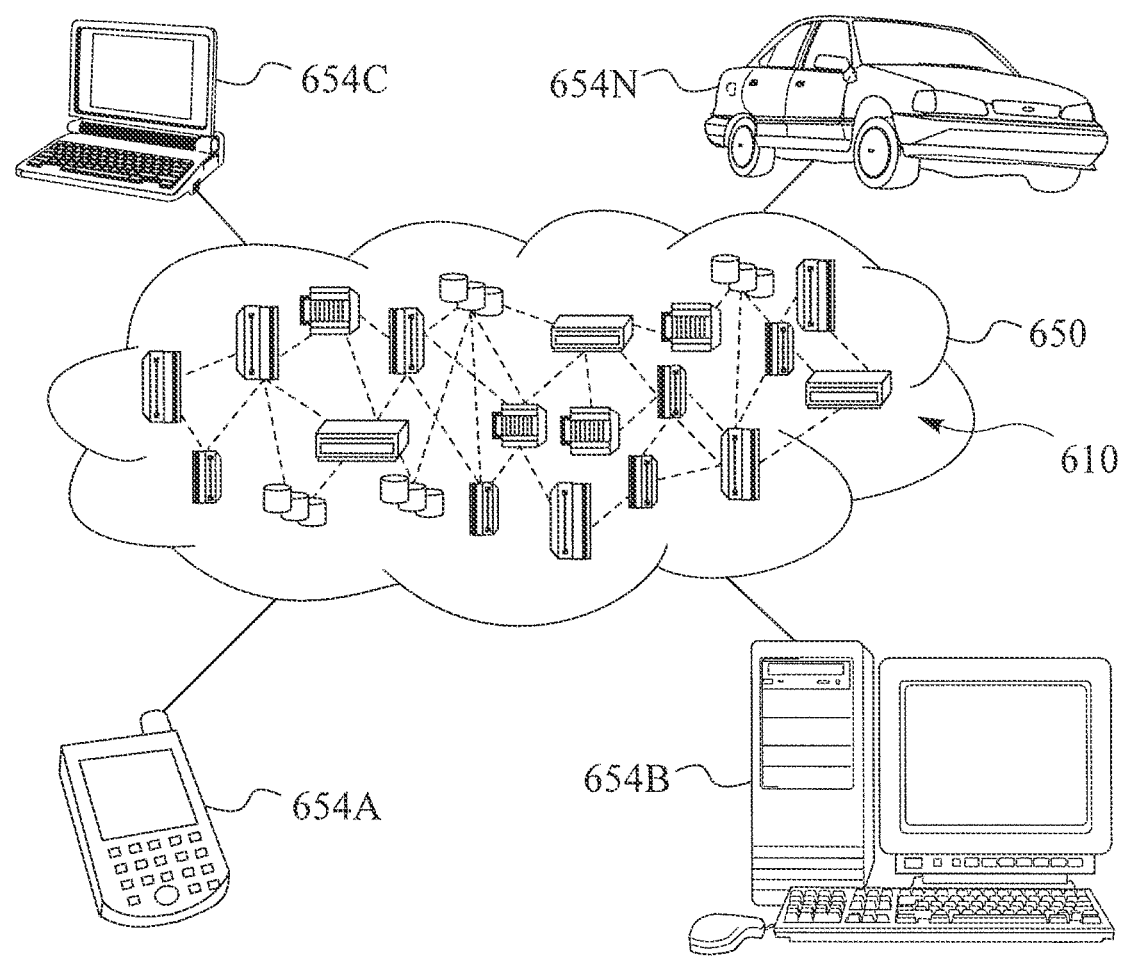
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
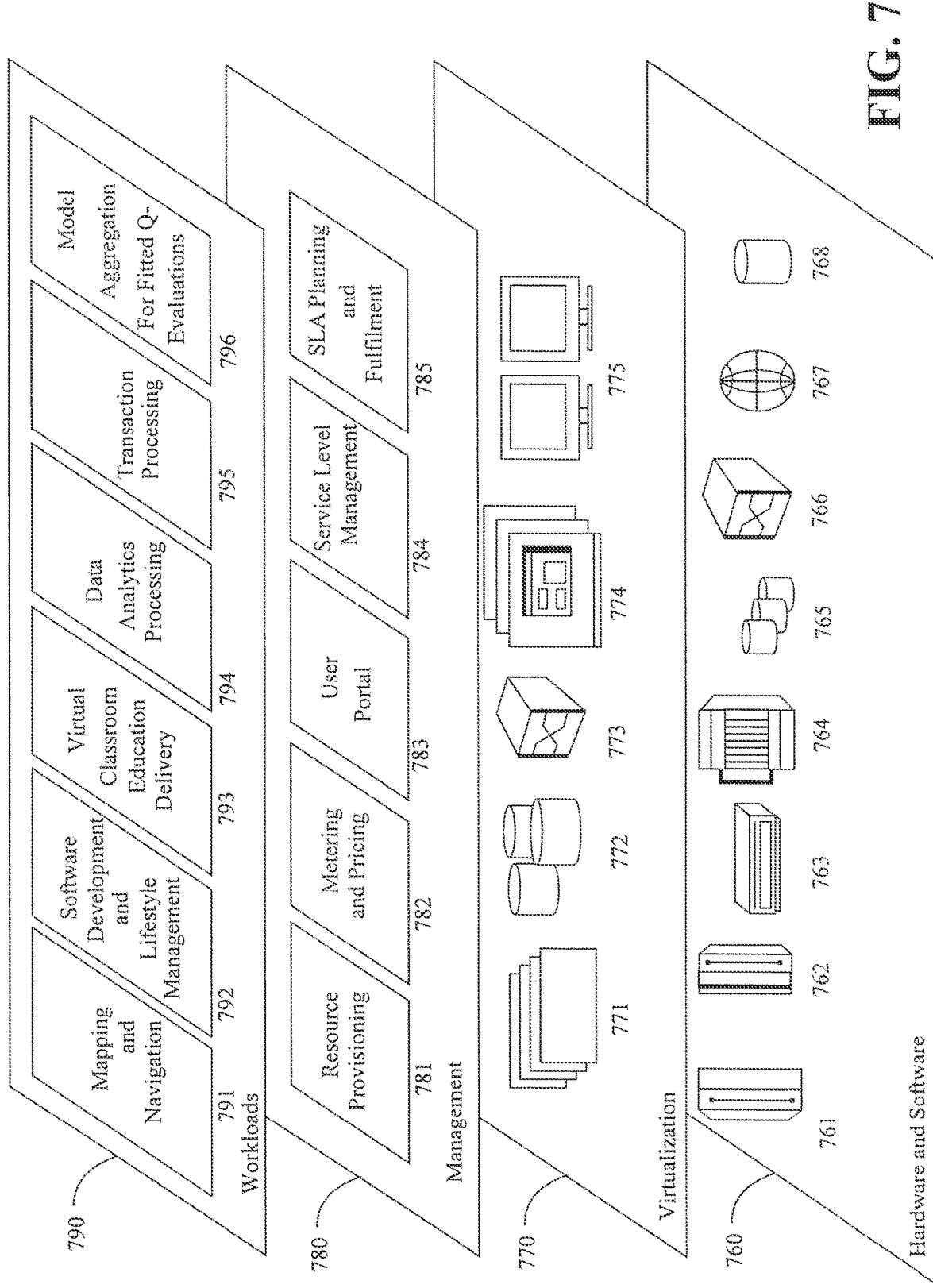
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and model aggregation for fitted Q-evaluation 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for value function estimation, comprising:
    (a) obtaining offline data D and a policy $\pi$, the offline data D including a set of tuples of a state, an action, a reward, and a resulting state;
    (b) setting an initial value of an estimated value function $\hat{Q}_0^\pi$ to zero and an initial value of a time step h to 1;
    (c) computing, for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$, where k denotes the index of the models and K denotes the number of the models;
    (d) computing, for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$ based on the offline data D, a policy $\pi$ to evaluate, and the estimated value function $\hat{Q}_{h-1}^\pi$ at time step h−1;
    (e) selecting a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \hat{Q}_{h-1}^\pi)$ among each candidate of the estimated value function $\hat{Q}_{k,h}$;
    (f) repeating steps (c) to (f) with incrementing time step h until time step h reaches an end of a time step H; and
    (g) outputting an estimated value function $\hat{Q}_H^\pi$ at the time step H.

2. The computer-implemented method of claim 1, wherein the estimated value function $\hat{Q}_H^\pi$ at the time step H represents an assessment metric of recommenders in an e-commerce service.

3. The computer-implemented method of claim 1, wherein the estimated value function $\hat{Q}_H^\pi$ at the time step H represents an assessment metric of production schedulers in a manufacturing plant.

4. The computer-implemented method of claim 1, further comprising computing a H-step expected utility $J_H(\pi)$ of policy $\pi$ based on the estimated value function $\hat{Q}_H^\pi$ at the time step H.

5. The computer-implemented method of claim 1, wherein the negative quality of the candidate of the estimated value function $\hat{Q}_{k,h}$ represents a mean squared error (MSE) with respect to a validation subset of the offline data D.

6. The computer-implemented method of claim 1, further comprising using the value function $\hat{Q}_H^\pi$ to estimate an expected utility of a decision-making policy as an expected value of the value function $\hat{Q}_H^\pi$ for offline policy evaluation.

7. The computer-implemented method of claim 1, further comprising:
    allowing use of the policy responsive to the value of the H-step expected utility $J_H(\pi)$ of policy $\pi$ being greater than a threshold utility value; and constraining use of the policy responsive to the value of the H-step expected utility $J_H(\pi)$ of policy $\pi$ being equal to or less than the threshold utility value.

8. The computer-implemented method of claim 1, wherein the bootstrapping estimator is a least-square estimator.

9. The computer-implemented method of claim 1, wherein the method is performed by an Advanced Driver Assistance System that uses the estimated value function $\hat{Q}_H^\pi$ at the time step H to control a vehicle system.

10. A computer program product for value function estimation, the computer program product comprising a non-transitory computer readable storage medium having program instructions embodied therewith, the program instructions executable by a computer to cause the computer to perform a method comprising:
(a) obtaining, by a processor device of the computer, offline data D and a policy $\pi$, the offline data D including a set of tuples of a state, an action, a reward, and a resulting state;
(b) setting, by the processor device, an initial value of an estimated value function $\hat{Q}_H^\pi$ to zero and an initial value of a time step h to 1;
(c) computing, by the processor device for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$, where k denotes the index of the models and K denotes the number of models;
(d) computing, by the processor device for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$ based on the offline data D, a policy $\pi$ to evaluate, and the estimated value function $\hat{Q}_{h-1}^\pi$ at time step h−1;
(e) selecting, by the processor device, a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \pi, \hat{Q}_{h-1}^\pi)$ among each candidate of the estimated value function $\hat{Q}_{k,h}$;
(f) repeating, by the processor device, steps (c) to (f) with incrementing time step h until time step h reaches an end of a time step H; and
(g) outputting, by the processor device, an estimated value function $\hat{Q}_H^\pi$ at the time step H.

11. The computer program product of claim 10, wherein the estimated value function $\hat{Q}_H^\pi$ at the time step H represents an assessment metric of recommenders in an e-commerce service.

12. The computer program product of claim 10, wherein the estimated value function $\hat{Q}_H^\pi$ at the time step H represents an assessment metric of production schedulers in a manufacturing plant.

13. The computer program product of claim 10, further comprising computing a H-step expected utility $J_H(\pi)$ of policy $\pi$ based on the estimated value function $\hat{Q}_H^\pi$ at the time step H.

14. The computer program product of claim 10, wherein the negative quality of the candidate of the estimated value function $\hat{Q}_{k,h}$ represents a mean squared error (MSE) with respect to the validation subset of the offline data D.

15. The computer program product of claim 10, further comprising using the value function $\hat{Q}_H^\pi$ to estimate an expected utility of a decision-making policy as an expected value of the value function $\hat{Q}_H^\pi$ for offline policy evaluation.

16. The computer program product of claim 10, further comprising:
allowing use of the policy responsive to the value of the H-step expected utility $J_H(\pi)$ of policy $\pi$ being greater than a threshold utility value; and
constraining use of the policy responsive to the value of the H-step expected utility $J_H(\pi)$ of policy $\pi$ being equal to or less than the threshold utility value.

17. The computer program product of claim 10, wherein the bootstrapping estimator is a least-square estimator.

18. The computer program product of claim 10, wherein the method is performed by an Advanced Driver Assistance System that uses the estimated value function $\hat{Q}_H^\pi$ at the time step H to control a vehicle system.

19. A computer processing system for value function estimation, comprising:
a memory device for storing program code; and
a processor device operatively coupled to the memory device for running the program code to:
(a) obtain offline data D and a policy $\pi$, the offline data D including a set of tuples of a state, an action, a reward, and a resulting state;
(b) set an initial value of an estimated value function $\hat{Q}_0^\pi$ to zero and an initial value of a time step h to 1;
(c) compute, for each of candidate models $\{M_k\}_{k=1}^K$ of an environment, a bootstrapping estimator $\delta_k$ that estimates a value function $Q_h^\pi$ at time step h based on the offline data D and an estimated value function $\hat{Q}_{h-1}^\pi$ at time step h−1 to obtain a candidate of an estimated value function $\hat{Q}_{k,h}$ for each of the candidate models $\{M_k\}_{k=1}^K$, where k denotes the index of the models and K denotes the number of the models;
(d) compute, for each candidate of the estimated value function $\hat{Q}_{k,h}$, a model selection criterion $C(\hat{Q}_{k,h}; D, \pi, \hat{Q}_{h-1}^\pi)$, where the model selection criterion $C(\hat{Q}_{k,h}; D, \pi, \hat{Q}_{h-1}^\pi)$ is a function to quantify a negative quality of the candidate of the estimated value function $\hat{Q}_{k,h}$, based on the offline data D, a policy $\pi$ to evaluate, and the estimated value function $\hat{Q}_{h-1}^\pi$, at time step h−1;
(e) select a candidate of an estimated value function $\hat{Q}_{k^*,h}$ as an estimated value function $\hat{Q}_h^\pi$ at time step h, where $\hat{Q}_{k^*,h}$ has a minimum value of the criterion $C(\hat{Q}_{k^*,h}; D, \pi, \hat{Q}_{h-1}^\pi)$ among each candidate of the estimated value function $\hat{Q}_{k,h}$;
(f) repeat steps (c) to (f) with incrementing time step h until time step h reaches an end of a time step H; and
(g) output an estimated value function $\hat{Q}_H^\pi$ at the time step H.

20. The computer processing system of claim 19, wherein the estimated value function $\hat{Q}_H^\pi$ at the time step H represents a recommender in an e-commerce service.

21. The computer processing system of claim 19, wherein the estimated value function $\hat{Q}_H^\pi$ at the time step H represents an assessment metric of production schedulers in a manufacturing plant.

22. The computer processing system of claim 19, wherein the processor device further runs the program code to compute a H-step expected utility $J_H(\pi)$ of policy $\pi$ based on the estimated value function $\hat{Q}_H^\pi$ at the time step H.

23. The computer processing system of claim 19, wherein the negative quality of the candidate of the estimated value function $\hat{Q}_{k,h}$ represents a mean squared error (MSE) with respect to a validation subset of the offline data D.

24. The computer processing system of claim 19, wherein the processor device further runs the program code to use the value function $\hat{Q}_H^\pi$ to estimate an expected utility of a decision-making policy as an expected value of the value function $\hat{Q}_H^\pi$ for offline policy evaluation.

25. The computer processing system of claim 19, wherein the processor device further runs the program code to allow use of the policy responsive to the value of the H-step expected utility $J_H(\pi)$ of policy $\pi$ being greater than a threshold utility value, and constrain use of the policy responsive to the value of the H-step expected utility $J_H(\pi)$ of policy $\pi$ being equal to or less than the threshold utility value.

* * * * *